Oct. 18, 1960  W. W. PORTER  2,956,385
VINE STRIPPING HARVESTER
Filed Nov. 19, 1958  4 Sheets-Sheet 3
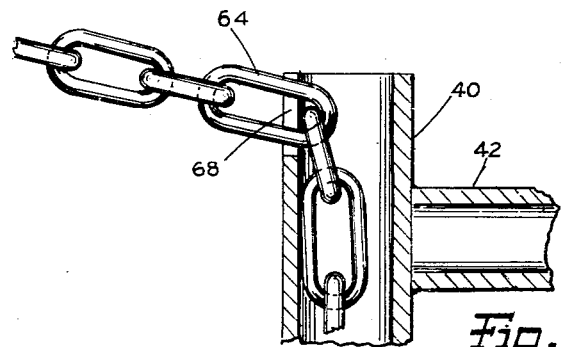
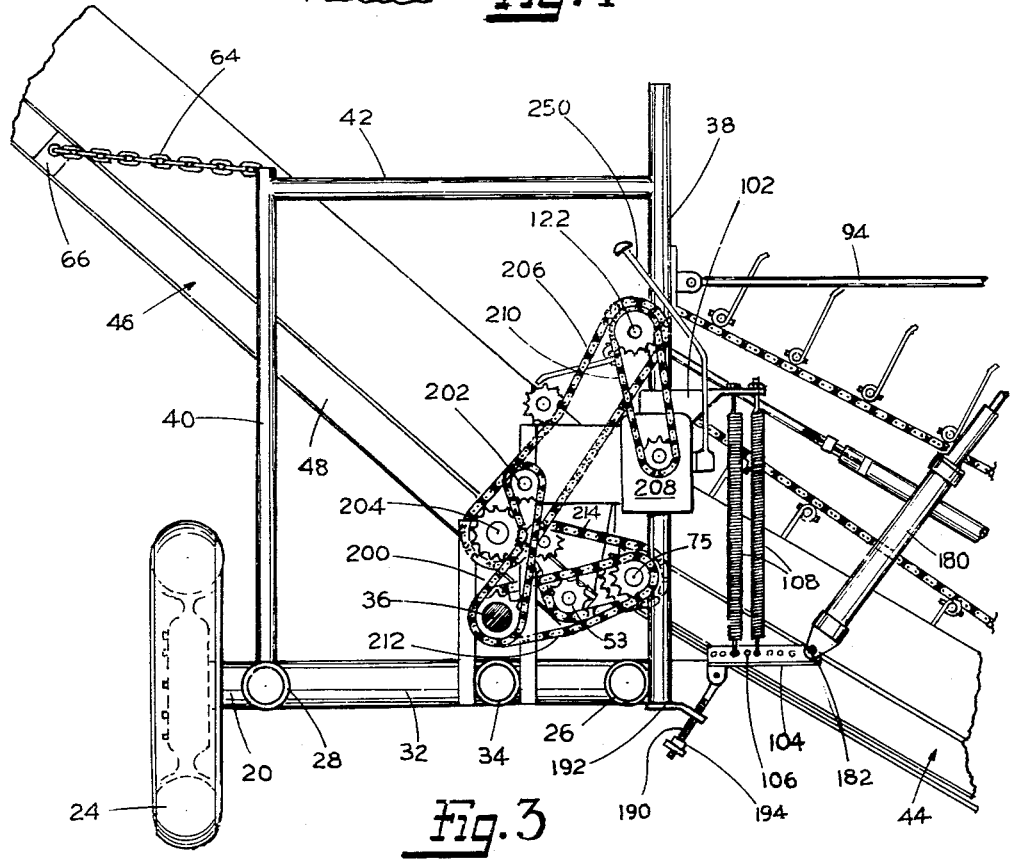
INVENTOR.
WELLINGTON W. PORTER
BY
ATTORNEY

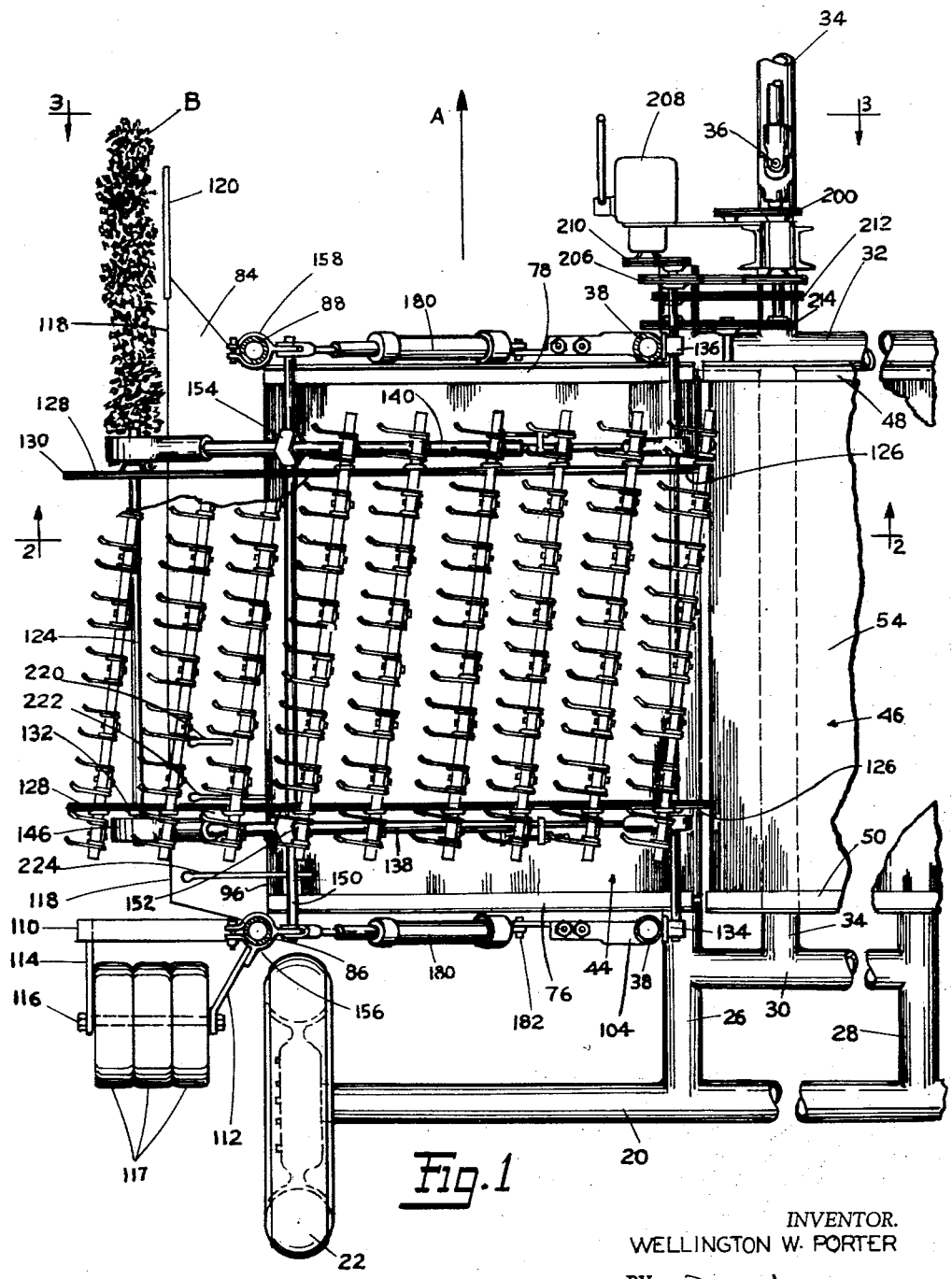

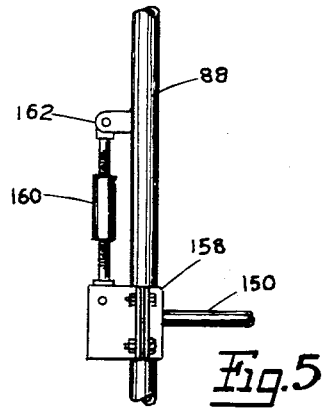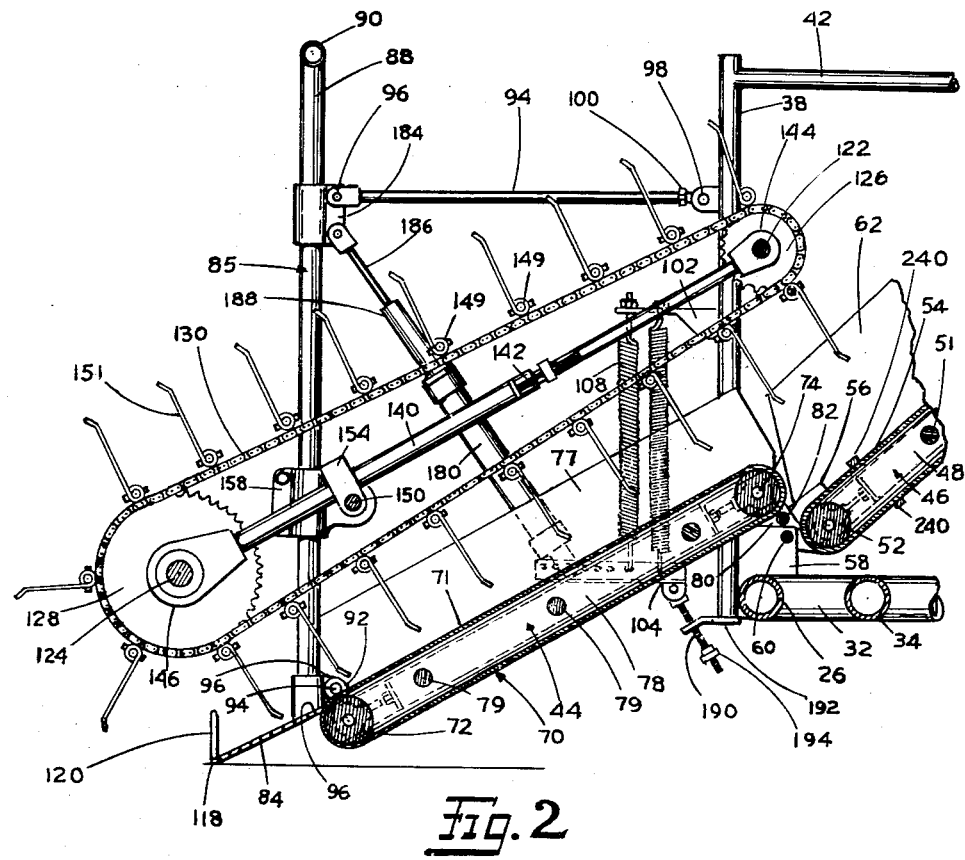

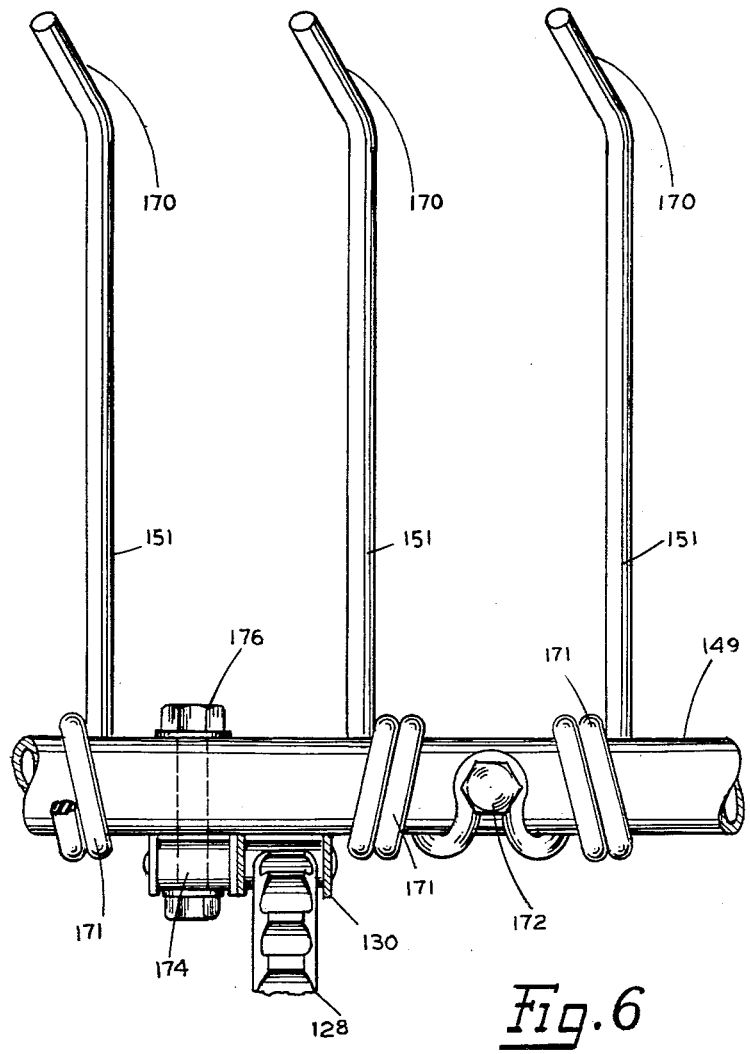

United States Patent Office 2,956,385
Patented Oct. 18, 1960

2,956,385
VINE STRIPPING HARVESTER
Wellington W. Porter, Dublin Road, R.D. #2, Waterloo, N.Y.
Filed Nov. 19, 1958, Ser. No. 774,857
14 Claims. (Cl. 56—19)

This invention relates to harvesters and more particularly to harvesters adapted to harvest by a vine stripping operation.

In the harvesting of lima beans and similar vine growing legumes, it has been the practice in the harvesting thereof to cut the vines as close to the ground and harvest the stalk, leaves and pods by a travelling cutter and conveyor mechanism adapted to discharge into accompanying trucks. A form of such apparatus is shown in U.S. Patent No. 2,729,049 granted January 3, 1956. When vines are cut in the manner referred to each vine cut is unitary in nature. Mechanism has been employed to deliver such vines up a conveyor comprising tines, which tines require stripping to prevent accumulation of vines upon the tines, and fouling of the conveyor. Such tines require a stripping mechanism due to the unitary nature of the vines cut in the harvesting thereof.

The present invention is directed to apparatus which strips the vines from the rooted stalks leaving the stalks rooted in the ground. The leaves, stems and pods or the like are thus severed from the stalk and do not constitute unitary individual vines liable to entangle with conveyor tines, and the strippings thereby free themselves from the tine stalk stripper in the conveying process without the requiring of tine stripping mechanism.

The invention further has to do with a tine stripping apparatus revolving about an axis located parallel to and substantially over a vine row whereby the stripping tines sweep crosswise through the vine row in a spiral path as the apparatus is propelled along the field. The invention further has to do with a combined vine stripping apparatus adapted to sweep across and through the vines and thereafter coact with and facilitate the conveyance of the vine strippings to an elevation suitable, for continuous loading of truck conveyors moving abreast of the stripper.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a top plan view with parts broken away of the left hand portion of the harvester;
Figure 2 is a sectional view taken substantially on the line 2—2 of Figure 1;
Figure 3 is an elevational view taken substantially on the line 3—3 of Figure 1;
Figure 4 is a fragmentary enlarged detail view partly in section of the upper conveyor chain lock;
Figure 5 is a fragmentary detail of the adjustment of the stripper elevation; and
Figure 6 is a fragmentary illustration of stripper tines and their mount upon the sprocket chains.

Referring to the drawings, there is shown in Figures 1 and 3 an axle 20 disposed to the rear of the apparatus having a left rear wheel 22, and (in Figure 3, looking to the rear) a right rear wheel 24. From the axle 20, there extends forwardly a frame composed of tubular members 26 and 28, with transverse members 30 and 32, and a forwardly extending member 34 intermediate the members 26 and 28, forming a tongue or drawbar adapted to be coupled to a tractor, for pulling the apparatus, as well as supporting the forward end of the apparatus. The tractor supplies power for the apparatus from a tractor power take-off driving the apparatus power input shaft 36.

Extending upward, at the front and at the rear of the apparatus, from the frame members 26 and 28 are vertical frames each composed of vertical members 38 and 40 connected adjacent their upper ends by transverse horizontal members as at 42. A wide endless belt conveyor 44 extends from above the frame member 26 downwardly to the left of the apparatus. A second endless belt conveyor 46 extends from above the frame members 26 and 28, upward to the right of the apparatus. The latter conveyor projects well to the right of the tread of the apparatus, as determined by the spacing of the wheels 22 and 24 and to a height sufficient for discharge into a truck, which moves along abreast of and to the right of the apparatus during harvesting.

The conveyor 46 comprises spaced side members 48 and 50 rigidly connected by members such as 51, and a lower end roll 52, and an upper end roll (not shown) over which the endless belt 54 traverses. The lower end of each of the side members 48 and 50 are provided with a plate 56 pivoted to a plate 58, as at 60, the plates 58 being mounted on the frame member 26 and the respective supports 38. The conveyor 46 is provided with side plates as at 62, and the angle at which the conveyor rises may be varied by lengthening or shortening the active length of support chains, such as 64, disposed on opposite sides of the conveyor. Each chain is affixed to its respective conveyor or side member, 48 or 50, as is indicated at 66 at one end. The other end is allowed to hang within its respective tubular vertical support member 40, the chain being locked at any position by a slot 68 in the upper end of the support member, such slot being of a width to clear the diameter of the stock from which the links are formed, as indicated in Figure 4.

The conveyor 44 comprises an endless belt 70 extending between end rolls 72 and 74 journalled in spaced conveyor side members 76 and 78. The side members are rigidly interconnected by a plurality of transverse members 79 which provide a rigid frame and each are provided with a side plate as at 77. Each side member is provided with an upper end plate, as at 80, that is pivoted as at 82 to the plate 58. The lower end of the conveyor side members 76 and 78 are pivotally connected to a rectangular frame comprising an inclined apron 84, and a U frame 85 comprising vertical column members 86 and 88 rigidly connected at their upper ends by the fore and aft extending member 90. Each of the side members 76 and 78 of the conveyor 44, at their lower ends are provided with an ear 92 pivotally connected as at 94 to a plate 96 affixed to the respective vertical columns 86 and 88, and the upper edge 96 of the apron meets the conveyor belt substantially tangentially approximately as the upper reach 71 thereof leaves the conveyor belt roll 72.

Each of the members 86 and 88 of the U frame 85 are connected by links such as 94 to the respective members 38, each link being pivoted as at 96 and 98 to the frame 85 and the respective member 38. Each link is adjustable in length as is indicated at 100. A laterally extending bracket 112 affixed to the column 86, having rearwardly extending arms 112 and 114 support an axle 116 upon which a plurality of rubber tired rolls 117 are positioned. The rolls engage the ground and establish the height of the lower lip 118 of the apron 84 at the rear end thereof, the lip 118 extending substantially level, by reason of its support from the U frame 85, and its pivotal connections 94 to the frame of the conveyor 44. The forward end of the apron at the lip 118 is provided with a ground engaging skid in the form of a pointed horn 120.

Affixed to each of the columns 38 is a bracket 102, and affixed to each of the conveyor side members 76 and 78 is a plate 104 having perforations 106. Tension springs 108 extending between the plate 104, and bracket 102 counterbalance the weight of the conveyor assembly to the extent desired.

Located above the conveyor 44, and overhanging the apron 84 is an endless tined feeder and vine stripper adapted to strip the vines and assist delivery of strippings up the conveyor 44. The stripper comprises a plurality of comb-like members comprising spaced tines 151, which sweep across and through the vines of a row as the apparatus moves forward, taking the leaves, stems and beans from the vines, and effectively stripping the vines from the root and stalks. The stripper comprises spaced shafts 122 and 124 each carrying axially spaced sprockets 126 and 128, over which extend linked chains 130 and 132. The upper shaft 122 carrying sprockets 126 is journalled in bearings 134 and 136 mounted on the columns 38, and the lower shaft 124 carrying sprockets 128 is supported on spaced reach rods 138 and 140, adjustable as to length as at 142, and each having end bearings 144 and 146 for the respective shafts 122 and 124. The chains carry a plurality of tine carrying bars 149 which may be transverse, or slightly askew, as is indicated in Figure 1, where the forward end of each bar 149 lags behind the rearward end by reason of its mounting upon one chain several links to the rear of its mounting on the other chain.

The reach rods 138 and 140 rest on a transverse bar 150 and pass through guides 152 and 154 thereon, the bar 150 extending between the U frame members 86 and 88 upon which the bar is vertically adjustable. The general construction of the stripper, aside from the tines and the askew arrangement of the bars 149 corresponds essentially to that shown in U.S. Patent No. 2,729,049 granted January 3, 1956.

The opposite ends of bar 150 are provided with sleeves 156 and 158 slidable upon the members 86 and 88, and suitable right and left hand thread turn buckle mechanism 160 extending between the sleeves 156 and 158 and an ear 162 on each of the members 86 and 88 provide for vertical adjustment whereby the clearance between the ends of the tines 151 and the lower end of upper reach 71 of the conveyor belt 70, and the apron 84 may be adjusted. The transverse inclined or askew bars 149 are spaced along the chains 130 and 132 approximately 8″ or thereabouts, and are each provided with a plurality of pairs of tines, the free ends of which extend six inches or more beyond the bar 149. The tip end of each tine is inclined in the direction of movement and forwardly in respect to the movement of the apparatus, as is indicated at 170. The tines are spaced about 3 inches and are disposed in pairs and made of spring steel and coil about the bar 149 as at 171 and each pair is affixed to the bar as by the bolt 172. The bars are affixed to the chain by laterally disposed blocks 174 affixed to the links, and through which extends a bolt 176.

Hydraulic cylinders 180 pivoted at their lower ends as at 182 on the plates 104 on either side of the conveyor, extend diagonally toward brackets such as 184. Pivotally attached to each of the brackets 184 is a rod 186 which extends slidably into the hollow tubular socket end 188 of the piston rod of the cylinders 180. The cylinders are adapted to quickly raise the U frame 82, and the apron 84 for clearance above the ground during transport through the rods 186, and the rods 186 are free within the socket end 188 to allow the frame 85 and apron 84 to rise for any unevenness or obstruction in the ground without moving the piston socket ends 188. It will be understood that the springs 108 are so adjusted in tension and as to number as to almost counterbalance the weight of the apron end of the conveyor 44, the stripper and frame 85.

Links 190 extending downwardly from the plates 104 slide through fixed brackets such as 192 on the lower end of the column members 38 and stop nuts such as 194 limit the maximum lift of the frame 85 either manually or by the action of the hydraulic cylinders 180.

The conveyors 44 and 46 are driven in the same direction with the rate of travel of the conveyor belt 46 being about 20% faster than that of conveyor 44. The stripper tines 151 on the underside, travel at about the same speed as the belt of conveyor 44.

To drive the conveyors and stripper, as well as to provide a supply of hydraulic pressure, the power shaft 36, driven from the tractor, drives through a reversing chain 200 and idler 202, a counter shaft 204, which in turn drives the upper sprocket shaft 122 of the stripper mechanism by a chain and sprockets 206. The hydraulic pump 208 for actuating the cylinders 180 is in turn driven by a chain and sprockets 210 from the upper sprocket shaft 122 of the stripper. The shaft 75 of the upper roll 74 of the lower conveyor is driven by a chain and sprockets 212 direct from the shaft 36 and the shaft 53 of the lower roll of the upper conveyor 46 is driven from the upper roll shaft 75 of the lower conveyor by a chain and sprockets including an idler as indicated at 214.

Secured to the apron 84 inwardly of its lip are several vine runner snagging bars 220, 222 and 224 of increasing length, the bars being affixed to the apron adjacent the lip and extending upwardly over the apron but closely spaced therefrom, the longer of said bars 224 extending over the conveyor belt.

In practice the apparatus will be drawn by a tractor along the field in a direction parallel with one row of the rows of pea vines to be stripped, the direction being indicated in Figure 1 by the arrow A. The left hand side of the machine is aligned with a row of pea vines B, the alignment being approximately with the shaft 124 disposed over the center of the row of vines and the lip 118 of the apron 84 disposed about three inches to the right of such row with the lip closely spaced from the ground. It will be appreciated that the ground over which the tread of the apparatus travels will be previously harvested of pea vines which have been stripped to the bare. The apparatus will be propelled along the vine at a rate of about three miles per hour and the stripper tines will be moved by the chains and sprockets at a rate of 300 to 500 feet per minute. It will thus be seen that as the apparatus progresses along the vine row the tines 151 with their inclined tip ends 170 will sweep or comb through the vines with the points of the tines sweeping close to the ground and the apron 84. The action resulting from the sweeping of the tines through the row is such as to remove from the vines all the leaves, stems and beans, leaving nothing but a portion of the bare stalk, over which the rollers 117 travel. The bars 220, 222 and 224 which extend across the apron are adapted to catch any ground runners which initially will be lifted from the ground by the horn 120 as the machine is moved along the row. The bars 220, 222 and 224 rake across the runners, stripping such beans and leaves therefrom in so doing or severing the runner stem from the stalk. By arranging the tine carrying bars askew in the manner shown, an efficient helical stripping action is produced upon the vines. Tests have shown by count that approximately 98% of the beans are removed from the vines by the action described. The beans and vines upon removal are carried up the conveyor 44 by action of the conveyor as well as the propelling action of the tines. The spacing of the tines from the conveyor increases towards the upper end of the conveyor and the whipping action of the tines in turning around the upper sprockets 126, which are of smaller diameter than the lower sprockets 128, causes the vine strippings to be discharged from the tines and the strippings are thus dumped upon the second conveyor 46. The second conveyor may have a plurality of transverse cleats 240 disposed upon the flexible rubber bed thereof to assure transport of the strippings up and over the top where they are allowed to drop into a truck which is driven abreast of the machine beneath the upper end of the conveyor 46.

It will be appreciated that in order to start the apparatus down a row of vines, it will be necessary to initially align the stripping mechanism with respect to the row to be stripped. The positioning of the apparatus preparatory to the start down a row is facilitated by the provision of the hydraulic cylinders which through operation of the control 250 may be employed to quickly lift the apron and stripping apparatus high enough to clear the vine row preparatory to aligning with the row immediately prior to stripping such row.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A vine stripping harvester for vines growing in a row comprising a frame, ground engaging wheels thereon, a laterally inclined apron mounted in the frame and extending lengthwise of the frame and having a lower lip disposed along one side of the frame close to the ground and extending in a direction parallel with the plane of the wheels, said lip being adapted to be moved along on one side of and immediately adjacent the root ends of and in parallel relation to a row of vines to be stripped, a shaft extending in substantially parallel relation to the lip and located above the lip, and journalled on the frame, and tine means rotatable about said shaft, said tine means including a plurality of tines radially disposed about said shaft, the outer end of said tines being adapted to sweep crosswise through a vine row across said lip in closely spaced relation thereto.

2. A vine stripping harvester for vines growing in a row comprising a frame, ground engaging wheels thereon, a laterally inclined apron mounted in the frame and extending lengthwise of the frame and having a lower lip disposed along one side of the frame close to the ground and extending in a direction parallel with the plane of the wheels, said lip being adapted to be moved along on one side of and immediately adjacent the root ends of and in parallel relation to a row of vines to be stripped, a shaft extending in substantially parallel relation to the lip and located above the lip, and journalled on the frame, and tine means rotatable about said shaft comprising a multiplicity of tines extending substantially radially of said shaft in moving angularly there around, said tines being of a length to sweep close to the ground and said apron lip and adapted to sweep downwardly and transversely and towards said apron and through a vine row disposed laterally just beyond said apron lip.

3. A vine stripping harvester for vines growing in a row comprising a frame, ground engaging wheels thereon, an apron mounted on and extending lengthwise of the frame, and having a lengthwise extending lip along one side adapted to be disposed close to the ground extending in substantially parallel relation to the plane of the wheels, an inclined endless belt conveyor having an end adjacent the other side of said apron for receiving vine strippings moving up said apron, and extending upwardly and transversely of said frame, spaced shafts extending in substantially parallel relation to the lip and disposed above the lip of said apron and above the upper end of said conveyor, and endless tine stripping means mounted on said shafts and disposed above said apron and conveyor, and extending laterally beyond the lip of said conveyor to sweep cross-wise through a row of vines disposed parallel to and spaced laterally beyond and adjacent the apron lip.

4. A vine stripping harvester for vines growing in a row comprising a frame, ground engaging wheels thereon, an apron mounted on and extending lengthwise of the frame, and having a lengthwise extending lip along one side adapted to be disposed close to the ground and extending generally parallel with the plane of the wheels, an inclined endless belt conveyor having an end adjacent the other side of said apron for receiving vine strippings moving up said apron, and extending upwardly and transversely of said frame, spaced shafts extending in substantially parallel relation to the lip and disposed above the lip of said apron and above the upper end of said conveyor, and endless tine stripping means mounted on said shafts and disposed above said apron and conveyor, and extending laterally beyond the lip of said conveyor to sweep cross-wise through a row of vines disposed parallel to and spaced laterally beyond and adjacent the apron lip, and means for driving the adjacent reaches of said conveyor belt and said endless stripping means in the same direction and away from said apron.

5. A vine stripping harvester for vines growing in a row comprising a frame, ground engaging wheels thereon, an apron mounted on and extending lengthwise of the frame, and having a lengthwise extending lip along one side adapted to be disposed close to the ground and parallel with a row, an inclined endless belt conveyor having an end adjacent the other side of said apron, and extending upwardly and transversely of said frame, spaced shafts disposed above the lip of said apron and above the upper end of said conveyor, and endless tine stripping means mounted in said shafts and disposed above said apron and conveyor, and extending laterally beyond the lip of said conveyor to sweep through a row of vines disposed parallel to and spaced laterally beyond and adjacent the apron lip, said tine stripping means comprising spaced sprockets on each of said shafts, spaced chains on said sprockets, a plurality of bars each mounted on said chains, and a plurality of spaced tines mounted on said bars and adapted to project radially outward of the shafts on passing therearound, said tines being of a length to sweep through and strip said row of vines and propel the strippings across said apron and up said conveyor.

6. A vine stripping harvester for vines growing in a row comprising a frame, ground engaging wheels thereon, an apron mounted on and extending lengthwise of the frame, and having a lengthwise extending lip along one side adapted to be disposed close to the ground and parallel with a row, an inclined endless belt conveyor having an end adjacent the other side of said apron, and extending upwardly and transversely of said frame, spaced shafts disposed above the lip of said apron and above the upper end of said conveyor, and endless tine stripping means mounted in said shafts and disposed above said apron and conveyor, and extending laterally beyond the lip of said conveyor to sweep through a row of vines disposed parallel to and spaced laterally beyond and adjacent the apron lip, said tine stripping means comprising spaced sprockets on each of said shafts, spaced chains on said sprockets, a plurality of bars, each mounted on said chains, said bars being mounted askew with the rearward ends thereof being mounted on its chain ahead of the mounting of the forward end on its chain, and a plurality of spaced tines mounted on said bars and adapted to project radially outward of the shafts on passing therearound, said tines being of a length to sweep through and strip said row of vines and propel the strippings across said apron and up said conveyor.

7. A vine stripping harvester for vines growing in a row comprising a frame, ground engaging wheels thereon, an apron mounted on and extending lengthwise of the frame, and having a lengthwise extending lip along one side adapted to be disposed close to the ground and parallel with a row, an inclined endless belt conveyor having an end adjacent the other side of said apron, and extending upwardly and transversely of said frame, spaced shafts disposed above the lip of said apron and above the upper end of said conveyor, and endless tine stripping means mounted in said shafts and disposed above said apron and conveyor, and extending laterally beyond the lip of said conveyor to sweep through a row of vines disposed parallel to and spaced laterally beyond and adjacent the apron lip, said tine stripping means comprising spaced sprockets on each of said shafts, spaced chains on said sprockets, a plurality of bars, each mounted on said chains and extending out of parallelism with said apron lip, and a plurality of spaced tines mounted on said bars and adapted to project radially outward of the shafts on passing therearound, said tines being of a length to sweep through and strip said row of vines and propel the strippings across said apron and up said conveyor.

8. A harvester for vines growing in a row comprising a frame having ground engaging wheels disposed on a transverse axis, an inclined endless belt conveyor mounted on said frame and having its lower end extending longitudinally of said frame and to one side thereof, and close to the ground, a lengthwise extending apron inclined laterally and having a lower edge disposed close to the ground said edge being adapted to be disposed adjacent to and parallel with a row, and an upper edge extending to the lower end of said conveyor, and rotary vine stripper means disposed in part over said apron and in part beyond said lower edge and rotatable on an axis extending substantially longitudinal with respect to said frame.

9. A vine stripping harvester comprising a frame, a rear axle having spaced ground engaging wheels, and a forward tongue adapted for coupling upon and support from a tractor vehicle, a pair of spaced uprights extending from said frame centrally thereof, and forward and rearward thereof, a rectangular frame disposed to one side of said frame having a lengthwise extending apron forming the lower portion of said frame, said apron being transversely inclined and having a lengthwise extending lip on the outer side thereof adapted to be located close to the ground and adjacent a vine row disposed laterally beyond, an inclined endless belt conveyor having end shafts and a frame, said frame having its upper end disposed between and pivoted to said uprights, and its lower end pivoted to said rectangular frame adjacent the upper inside edge of said apron, pivoted links disposed above said conveyor and connecting each upright with said rectangular frame, means for counterblancing the weight of said rectangular frame, a shaft journalled on said uprights, a horizontal support bar mounted on said rectangular frame, a pair of spaced reach rods extending from said shaft and extending across said support bar, a shaft journalled on the ends of said reach rods beyond said support bar, spaced sprockets on each of said shafts, and spaced endless chains on said sprockets, a plurality of bars mounted on said chains, each having a plurality of outwardly extending tines, said tines being of a length to sweep through and strip the vines of said row and sweep the strippings across said apron and upon said conveyor.

10. A vine stripping harvester comprising a frame, a rear axle having spaced ground engaging wheels, and a forward tongue adapted for coupling upon and support from a tractor vehicle, a pair of spaced uprights extending from said frame centrally thereof, and forward and rearward thereof, a rectangular frame disposed to one side of said frame having a lengthwise extending apron forming the lower portion of said frame, said apron being transversely inclined and having a lengthwise extending lip on the outer side thereof adapted to be located close to the ground and adjacent a vine row disposed laterally beyond, an inclined endless belt conveyor having end shafts and a frame, said frame having its upper end disposed between and pivoted to said uprights, and its lower end pivoted to said rectangular frame adjacent the upper inside edge of said apron, pivoted links disposed above said conveyor and connecting each upright with said rectangular frame, means for counterbalancing the weight of said rectangular frame, a shaft journalled on said uprights, a horizontal support bar mounted on said rectangular frame, a pair of spaced reach rods extending from said shaft and extending across said support bar, a shaft journalled on the ends of said reach rods beyond said support bar, spaced sprockets on each of said shafts, and spaced endless chains on said sprockets, a plurality of bars mounted on said chains, each having a plurality of outwardly extending tines, said tines being of a length to sweep through and strip the vines of said row and sweep the strippings across said apron and upon said conveyor, and means for rotating one of said sprocket shafts and one of said conveyor shafts in opposite direction to propel strippings up the conveyor.

11. A vine stripping harvester comprising a frame, a rear axle having spaced ground engaging wheels, and a forward tongue adapted for coupling upon and support from a tractor vehicle, a pair of spaced uprights extending from said frame centrally thereof, and forward and rearward thereof, a rectangular frame disposed to one side of said frame having a lengthwise extending apron forming the lower portion of said frame, said apron being transversely inclined and having a lengthwise extending lip on the outer side thereof adapted to be located close to the ground and adjacent a vine row disposed laterally beyond, an inclined endless belt conveyor having end shafts and a frame, said frame having its upper end disposed between and pivoted to said uprights, and its lower end pivoted to said rectangular frame adjacent the upper inside edge of said apron, pivoted links disposed above said conveyor and connecting each upright with said rectangular frame, a shaft journalled on said uprights, a horizontal support bar mounted on said rectangular frame, a pair of spaced reach rods extending from said shaft and extending across said support bar, a shaft journalled on the ends of said reach rods beyond said support bar, spaced sprockets on each of said shafts, and spaced endless chains on said sprockets, a plurality of bars mounted on said chains, each having a plurality of outwardly extending tines, said tines being of a length to sweep through and strip the vines of said row and sweep the strippings across said apron and upon said conveyor, and ground engaging means for supporting said rectangular frame at a fixed height above the ground.

12. A vine stripping harvester comprising a frame, a rear axle having spaced ground engaging wheels, and a forward tongue adapted for coupling upon and support from a tractor vehicle, a pair of spaced uprights extending from said frame centrally thereof, and forward and rearward thereof, a rectangular frame disposed to one side of said frame having a lengthwise extending apron forming the lower portion of said frame, said apron being transversely inclined and having a lengthwise extending lip on the outer side thereof adapted to be located close to the ground and adjacent a vine row disposed laterally beyond, an inclined endless belt conveyor having end shafts and a frame, said frame having its upper end disposed between and pivoted to said uprights, and its lower end pivoted to said rectangular frame adjacent the upper inside edge of said apron, pivoted links disposed above said conveyor and connecting each upright with said rectangular frame, means for counterbalancing the weight of said rectangular frame, a shaft journalled on said uprights, a horizontal support bar mounted on said rectangular frame, a pair of spaced reach rods extending from said shaft and extending across said support bar, a shaft journalled on the ends of said reach rods beyond said support bar, spaced sprockets on each of said shafts, and spaced endless chains on said sprockets, a plurality of bars mounted on said chains, each having a plurality of outwardly extending tines, said tines being of a length to sweep through and strip the vines of said row and sweep the strippings across said apron and upon said conveyor, and means for rotating one of said sprocket shafts and one of said conveyor shafts in opposite direction to propel strippings up the conveyor, a second inclined endless belt conveyor mounted on said supports and extending upwardly and beyond the other side of the frame, the lower end of which is disposed below the upper end of the first named conveyor and the upper end of which is adapted to discharge into a truck driven abreast of the harvester.

13. A vine stripping harvester comprising a frame, ground engaging wheels thereon, an apron mounted on and extending lengthwise of the frame, and having a lengthwise extending lip along one side adapted to be disposed close to the ground, an inclined endless belt conveyor having an end adjacent the other side of said apron, and extending upwardly and transversely of said frame, spaced shafts disposed above the lip of said apron and above the upper end of said conveyor, and endless tine stripping means mounted on said shafts and disposed above said apron and conveyor, and extending laterally beyond the lip of said apron to sweep through a row of vines disposed parallel to and spaced laterally beyond and adjacent the apron lip, said tine stripping means comprising a plurality of rows of tines the ends of which are inclined forwardly and laterally in the direction of movement of the endless tine stripping means.

14. A vine stripping harvester comprising a frame, ground engaging wheels thereon, a laterally inclined apron mounted in the frame and extending lengthwise of the frame and having a lower lip disposed along one side of the frame, a shaft located above the lip, and journalled on the frame, and tine means rotatable about said shaft and adapted to sweep downwardly and transversely and towards said apron and through a vine row disposed laterally just beyond said apron lip, and ground engaging means associated with said apron to maintain said lip at a fixed height above and close to the ground.

References Cited in the file of this patent

UNITED STATES PATENTS

| | | |
|---|---|---|
| 2,703,953 | Altemus | Mar. 15, 1955 |
| 2,841,947 | Grew | July 8, 1958 |